UNITED STATES PATENT OFFICE.

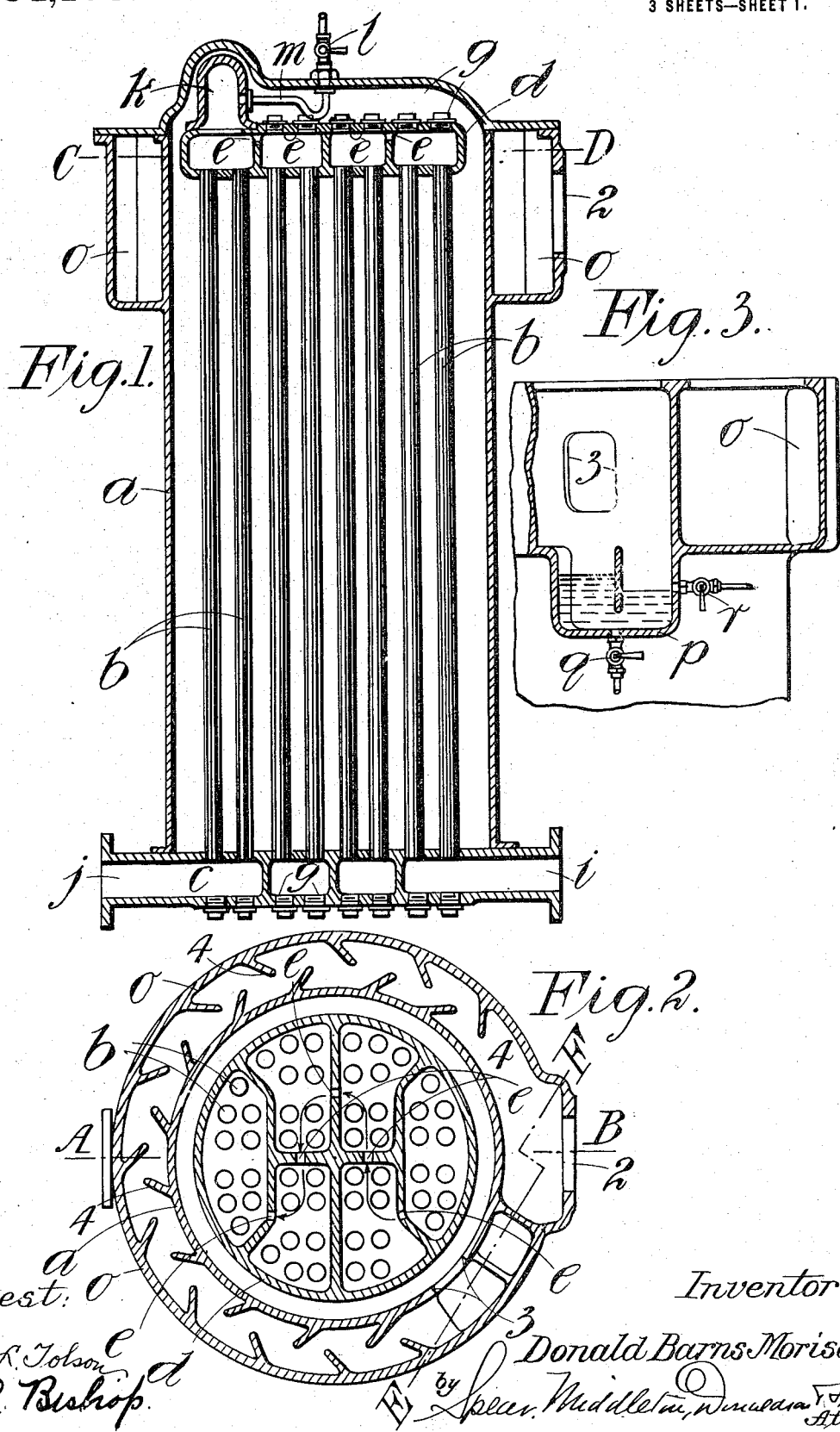

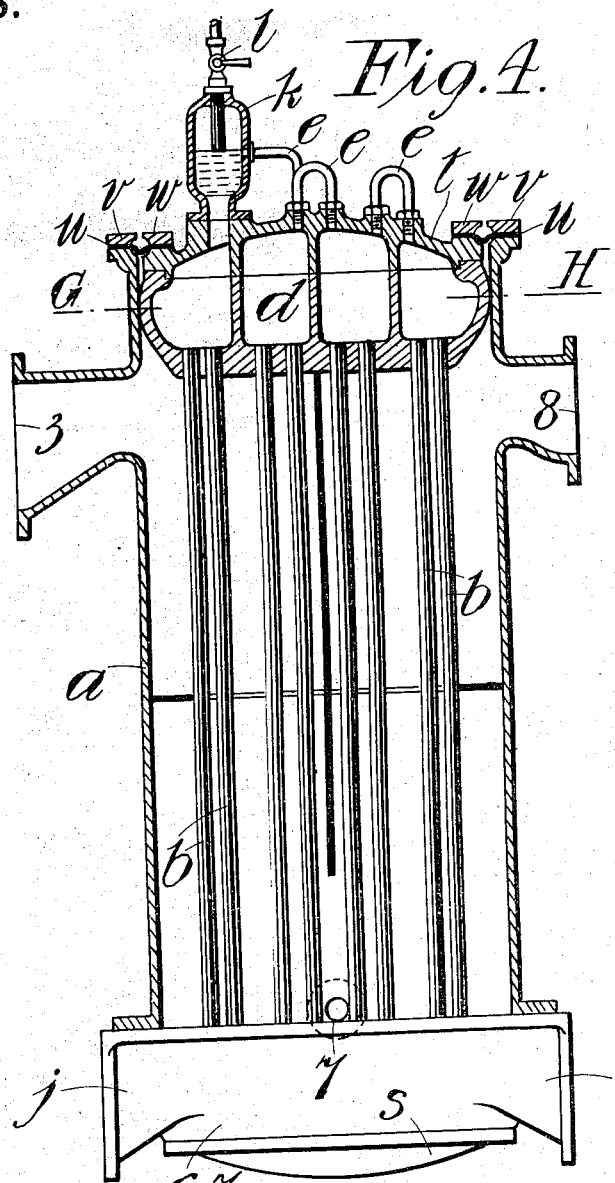
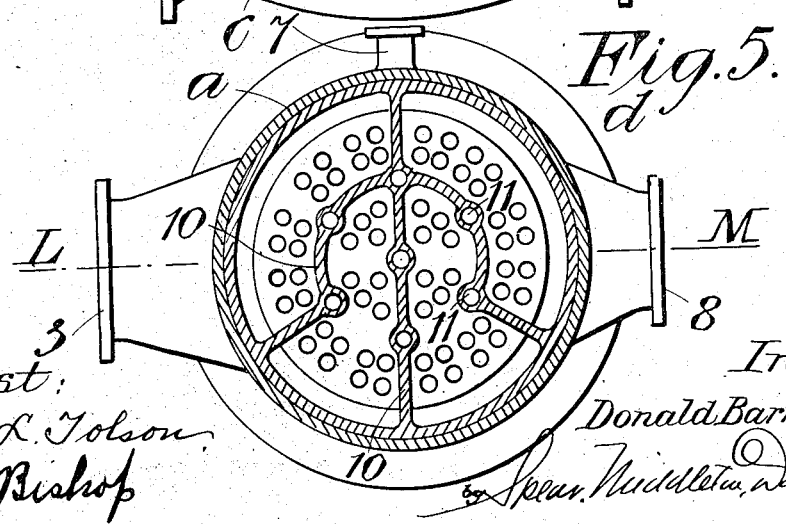

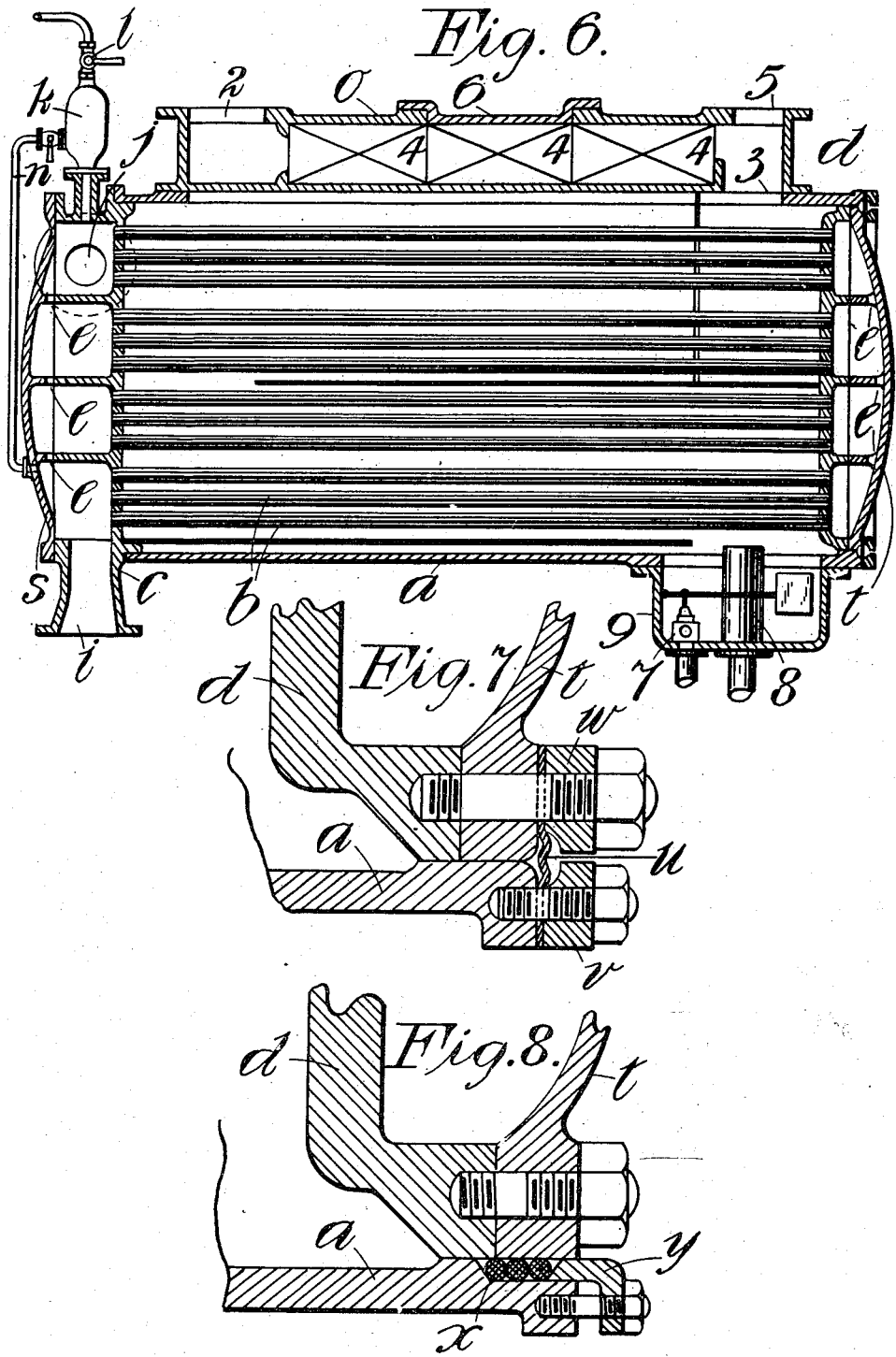

DONALD BARNS MORISON, OF HARTLEPOOL, ENGLAND.

SURFACE FEED-WATER HEATER.

1,184,198.  Specification of Letters Patent.  Patented May 23, 1916.

Application filed June 29, 1914. Serial No. 848,070.

*To all whom it may concern:*

Be it known that I, DONALD BARNS MORISON, a subject of the King of Great Britain and Ireland, residing at Hartlepool, in the county of Durham, England, have invented Improvements in Surface Feed-Water Heaters, of which the following is a specification.

This invention relates to surface feed water heaters of the kind comprising water receivers containing one or more compartments and connected together by heating tubes within a containing vessel, and has for object to provide improved constructural details whereby provision is afforded for the longitudinal expansion of the heating tubes and for the collection and discharge of air from the heated water, combined it may be with a steam cleansing device forming part of or jointed to the containing vessel.

The heater may consist of a cylindrical containing vessel placed horizontally, vertically or otherwise conveniently disposed, and fitted with heating tubes arranged between two water receivers which may be of known construction and provided with holes normally filled by screw plugs or provided with jointed covers, which when removed will allow of the withdrawal of the tubes. One of the receivers contains the inlet and outlet passages for the water, and is suitably jointed to the containing vessel all in the known manner. The other receiver is, in order to provide for expansion, flexibly disposed within the containing vessel, and it may be connected to it by an annular diaphragm preferably corrugated and suitably jointed to the receiver and to the containing vessel by removable rings, or there may be a gland or its equivalent between the receiver and the containing vessel. The water to be heated successively passes through the compartments in each water receiver, and in order to collect the air given off from the water, each compartment communicates with an adjoining compartment or with an air collecting chamber as by a port, pipe or passage through which air from one compartment may pass into an adjoining compartment, or air collecting chamber of lower pressure and from which it is discharged together it may be with a small quantity of water into the feed tank or elsewhere. The containing vessel may also comprise a steam cleansing chamber either cast on or jointed to the containing vessel, and adapted for the separation of oil from exhaust steam as from auxiliary engines on shipboard.

The accompanying drawings Figures 1 to 8 illustrate apparatus constructed according to my invention. Figs. 1, 2 and 3 illustrate a vertical tubular surface heater in which the upper part of the containing vessel is surrounded by a steam cleansing chamber; Figs. 4 and 5 show a modification of the heater shown in Figs. 1, 2 and 3 and in which the steam cleansing chamber is omitted; Fig. 6 shows a horizontal tubular surface heater, the upper portion of the containing vessel having attached to it a steam cleansing chamber, and Figs. 7 and 8 illustrate methods of forming steam tight expansion joints between an internal water receiver and the side of the containing vessel.

With reference to Figs. 1, 2, and 3, Fig. 1 is a sectional elevation on line A—B in Fig. 2. Fig. 2 is a sectional plan view on line C—D in Fig. 1, and Fig. 3 is a part sectional elevation on the line E—F in Fig. 2. The heater consists of a containing vessel $a$ fitted with heating tubes $b$ arranged between two water receivers $c$ and $d$ which contain holes provided with removable plugs $g$, through which the tubes may be examined, cleaned or withdrawn. Each water receiver is divided into compartments that are placed in communication with each other by the heating tubes $b$ so that the water entering the branch $i$ flows through the compartments in series and passes out through the branch $j$, all in a known manner. Now according to my invention the compartments in the receiver $d$ are provided with small ports or passages $e$ through which the liberated air collected in each compartment in the upper receiver $d$ passes from one compartment to another compartment of lower pressure and finally reaches the air collecting chamber $k$ from which it is discharged, it may be with a small quantity of water, through the cock $l$ that is flexibly connected to the air collecting chamber $k$ by the pipe $m$. Owing to the frictional resistance of the water in its passage through the tubes the pressure in the compartments will be successively less and therefore although the differences in the pressures are small I have found that provided the means of communication are suitable they are sufficient to promote the flow of the air through the successive compartments into the final air collecting chamber from which it is discharged from the apparatus. The heater is provided with a steam cleansing chamber $o$ having a steam inlet 2, a steam outlet 3 into the heater, oil and water separating devices 4, and a receptacle $p$ into which the separated oil and water can flow, the oil being discharged periodically by the cock $q$ and the water delivered continually through the cock $r$.

The heater shown in Figs. 4 and 5 is of similar construction to the heater illustrated in Figs. 1, 2, and 3. Fig. 4 being a sectional elevation on line L—M in Fig. 5, and Fig. 5 a sectional plan view on line G—H in Fig. 4. The heater consists of a containing vessel $a$ having an inlet 3 for the heating steam and an outlet 8 for the uncondensed steam, the drainage water being discharged through the outlet 7. The water receivers $c$ and $d$ which are connected together by the tubes $b$ are provided with covers $s$ and $t$ which when removed will allow of the withdrawal of the tubes $b$. The partitions 10 which divide the water receiver $d$ into compartments, not only form strengthening ribs for the receiver but also receive the studs 11 by which the cover $t$ is secured, and although not shown in section it will be understood that the lower receiver $c$ may be constructed in a similar manner. The receiver $d$ is flexibly connected to the containing vessel $a$ by an annular corrugated diaphragm $u$ (see Fig. 7) that is jointed to the vessel $a$ by the ring $v$ and to the receiver $d$ by the ring $w$. The compartments in the receiver $d$ are connected together by small pipes $e$ through which the liberated air collected in each compartment in the upper receiver $d$ passes from one compartment to another compartment of lower pressure and finally reaches the air collecting chamber $k$ from which it is discharged.

Figs. 6 and 7 show a modification of the arrangements already described, the containing vessel $a$ being horizontally disposed. The receivers $c$ and $d$ are provided with covers $s$ and $t$, and the receiver $d$ is flexibly connected to the containing vessel $a$ by an annular corrugated diaphragm $u$ (see Fig. 7) that is jointed to the vessel $a$ by the ring $v$ and to the receiver $d$ by the ring $w$, or the flexible connection may be in the form of a gland as illustrated in Fig. 8, in which the packing $x$ between the containing vessel $a$ and the receiver $d$ is held in position by the gland $y$. The compartments in each receiver $c$ and $d$ are in direct communication with each other by the ports or passages $e$ through which air from one compartment may pass into an adjoining compartment of lower pressure and be finally collected in the air chamber $k$ from which it is discharged together it may be with a small quantity of water through the cock $l$ into a feed tank or elsewhere. When the heater is provided with a steam cleansing chamber, the chamber may form part of the heater or it may be constructed separately and jointed to the shell of the heater at the top as shown in Fig. 6, in which the steam cleansing chamber $o$ is provided with a steam inlet 2, a steam outlet 3 into the heater and an outlet 5 through which excess steam may flow, as for example, to a steam turbine. The oil separating devices 4 are in the form of withdrawable sections which may be removed through the door 6. A receptacle 9 is connected to the bottom of the heater and receives the condensed steam from the heater and it may be the drainage water from the steam cleansing chamber $o$, the discharge of water from the receptacle being controlled by the float operated valve 7 which automatically regulates the discharge water without affecting the pressure maintained in the heater, the steam not condensed in the heater flowing preferentially together with accumulated air, through the pipe 8 into a secondary heater in the manner described in the specification of my Patent Number 1,108,210. A pipe $n$ may be provided, for the purpose of conveying the air from the first compartment in the receiver $c$ direct to the air collecting chamber $k$.

The heaters are fitted with the usual mountings and requirements necessary for the satisfactory working of the apparatus, and may be provided with suitable connections in order that they may be adapted for use in connection with feed water heating apparatus of the kind described in the specification of my Patent Number 1,108,210.

I am aware that it is known practice to discharge air from the water compartments of a heater into a common outlet, but in apparatus according to my invention the air passes from one compartment into an adjoining compartment or air collecting chamber of slightly lower pressure, whereby for a given discharge of air from the heater there is a minimum discharge of water.

What I claim is:—

1. A surface water heater comprising a vessel containing water receivers connected together by heating tubes, said receivers containing compartments through which the water successively flows, small passages which place two or more of said compartments in communication with each other and through which passages the air liberated from the water in one compartment flows into an adjoining compartment of lower pressure, and a chamber in which the air given off from the water is finally collected and discharged separately from the body of water passing through the heater.

2. A surface water heater comprising a vessel containing water receivers connected together by heating tubes, said receivers containing compartments through which the water successively flows, small passages which place two or more of said compartments in communication with each other and through which passages the air liberated from the water in one compartment flows into an adjoining compartment of lower pressure, a chamber in which the air given off from the water is finally collected and discharged, and a pipe connecting the compartment into which the water first enters with said chamber, for the purpose set forth.

Signed at West Hartlepool, in the county of Durham, England, this 17th day of June 1914.

DONALD BARNS MORISON.

Witnesses:
HARRY FOTHERGILL,
JAMES RUSSELL.